May 7, 1963 E. H. ORENICK ETAL 3,088,702
CABLE RETAINER
Filed May 17, 1961

INVENTOR.
EMIL H. ORENICK
MICHAEL W. ORENICK
BY
ATTORNEY.

United States Patent Office 3,088,702
Patented May 7, 1963

3,088,702
CABLE RETAINER
Emil H. Orenick, 9011 W. Moreland Road, Parma, Ohio, and Michael W. Orenick, 1224 Irene Road, Lyndhurst, Ohio
Filed May 17, 1961, Ser. No. 110,803
1 Claim. (Cl. 248—71)

This invention relates to fasteners and particularly to a retainer which may be employed to mount and retain articles such as electric cables, tubes, rods, etc., when such articles are to be secured to a support structure.

It is often desirable in the process of assembly of machinery and other articles of manufacture to provide retainers for wiring, tubing, and similar articles which may be readily fastened to a support prior to insertion of the wires or other articles to be mounted on the support. Such retainers should be easily secured about the element to be supported without requiring excessive accuracy of location. They should be readily mounted on the support wall and about the article to be supported and should have high retentive qualities in relation to the wall as well as the supported article. A retainer embodying the invention provides these features. The retainer includes advantages of unitary construction, simplicity of manufacture, and ease of handling. It is preferably manufactured of a flexible plastic material which also effectively insulates the article electrically, thermally and mechanically from the supporting structure. Thus the article mounted by means of the retainer is not likely to be electrically grounded through the retainer, if it is of an electrical nature. Heat is not likely to be transferred through the retainer either to or from the article supported, and vibrations present in either the supported article or the supporting structure are not readily transmitted through the retainer. The retainer is provided with positive lock features for locking the retainer to the supporting structure and independently locking the retainer to the article being supported. The retainer may be readily inserted in place and is held securely therein.

Figure 1:
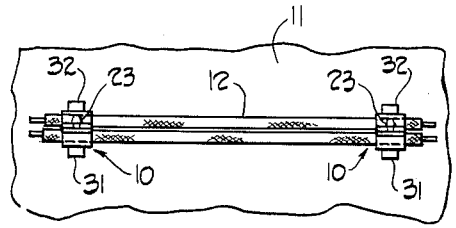
FIGURE 1 is a front elevation of a portion of a panel wall showing two of the retainers which are the subject of this invention mounted thereon and supporting a section of electric cables therebetween.
Figure 2:
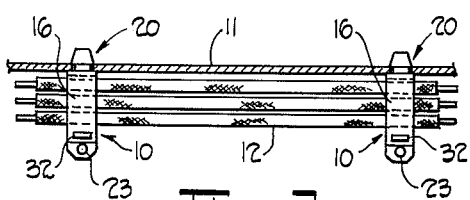
FIGURE 2 is a top plan view of the same.

Referring more particularly to the drawing, there is seen in FIGURES 1 and 2 two of the retainers which are the subject of this invention, broadly indicated by reference numeral 10, mounted on a panel wall 11 and supporting electric cables 12 therebetween.

The retainer 10 comprises a substantially V-shaped structure having a base portion 14, a depending anchor head 20, and upstanding, opposed and outwardly divergent arms 16 and 17 positioned on opposite edges of the base, which is substantially ½″ square shape.

The retainer 10 may be made of any material having the required physical characteristics of flexibility, dimensional and heat stability, freedom from sharp edges that might abrade the cables 12, and high dielectric strength.

A preferred material that meets all these qualifications is a plastic, commonly known by the trademark name "Nylon." This plastic is tough, wear resistant and stable under temperatures up to 300° F., which is most desirable for use around gasoline engines, where elevated temperatures are common.

The retainer 10 is cast in one piece with the length of the arms 16 and 17 determined by the size of the closed loop required to support the number of cables, tubes or rods to be retained thereon, as described hereinafter.

The anchor element 20 comprises a conical head 21. The diameter of the base 22 of the conical head 21 is greater than the diameter of the panel wall hole 33, which in the structure illustrated is ¼″ in diameter. The diameter of the stem 18 is less than or equal to that of the hole 33, so the stem may snugly fit through the hole 33.

The base 14 has a hinge groove 15 across the upper face thereof between the two arms 16 and 17.

Figure 3:
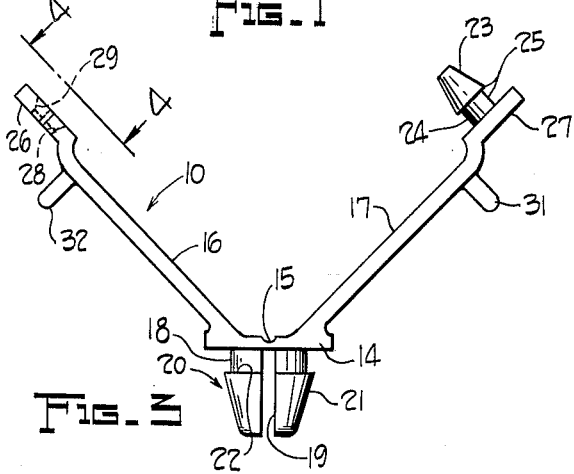
FIGURE 3 is an enlarged side elevation of one of the retainers that is the subject of this invention.
Figure 5:
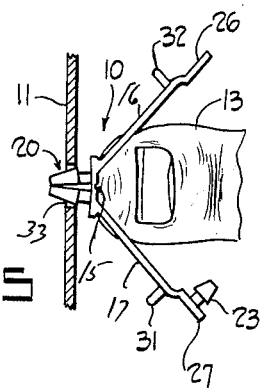
FIGURE 5 is a side view of the fastener showing the arms thereof in their outwardly flexed position, wherein the anchor head is contracted for passage through a hole in the wall panel.

Reference numeral 19 indicates a diametric slot cut through the anchor head 21 and stem 18, perpendicular to the under face of the base element 14 and in alignment with the base hinge groove 15, as is seen most clearly in FIGURE 3. The depth of the groove 15 is such that the two halves of the base 14, to which the arms 16 and 17 are attached, may be tilted relative to each other by appropriately tilting the arms to cause the depending halves of the anchor head 21 to flex toward or away from each other, as seen in FIGURES 5 and 6, respectively.

Figure 6:
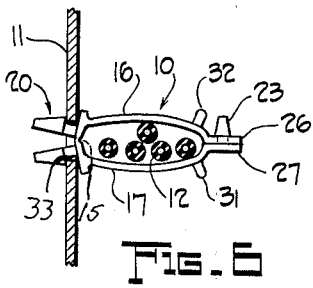
FIGURE 6 is a side view, partly in section, showing the retainer locked to the supporting wall panel and around the cables being supported.

The arms 16 and 17 have flat terminal ends 26 and 27 which are adapted to be brought into apposition to define a closed loop as seen in FIGURE 6.

Figure 4:
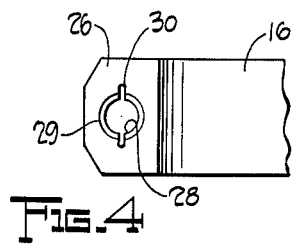
FIGURE 4 is a plan view of a section of one of the retainer arms taken along the line and in the direction of the arrows 4—4 of FIGURE 3.

The terminal end 26 of arm 16 has a bore 28 therethrough, including a tapered counter bore 29 faced toward arm 17. The bores 28 and 29 are slotted at 30, as seen in FIGURE 4, so that the peripheral edges of the bores may be flexed to permit entrance of the hereinafter described lock head 23.

A cylindrical stem 24 is mounted at the terminal end 27 of the arm 17 and a conical head 23 is supported on the end of the stem and faced toward arm 16, and its end bore 28. The diameter of the stem 24 is equal to or less than that of the bore 28, while the diameter of the cone bore 25 is greater than that of said bore. Reference numerals 31 and 32 indicate rigid finger grips extending outwardly of the arms 17 and 16, respectively, proximate the head 23 and bore 28 thereof, as seen in FIGURE 3.

To insert the retainer 10 in the hole 33 of a wall panel 11, the point end of the anchor element 20 is positioned in the hole 33, as seen in FIGURE 5. The two arms 16 and 17 are tilted outward to their first position by placing the thumb 13 between them and pressing down on their base ends. The outward tilting of the arms causes the base 14 to flex downward along its hinge groove 15 to tilt the depending halves of the anchor head 21 toward each other, thereby reducing the diameter of the head to permit its base end 22 to pass through the hole 33. Once the head 21 is through the hole 33 and on the back-side of the panel 11, the thumb pressure is released permitting the head 21 to spring back to its normal shape wherein the base end 22 acts as a shoulder to lock the head against withdrawal from the hole 33. The retainer 10 is now anchored on the wall 11 by the anchor element 20. Cables, rods, tubes, or whatever is to be held by the retainer, are then placed across the base 14 and between the divergent arms 16 and 17. The thumb and fore-finger are then placed against the finger grips 31 and 32 which are pressed together to flex the arm toward each other to their second position wherein the ends 26 and 27 are brought into apposition and the lock head 23 is pressed through the bore 28 to lock the ends of the arms together to define a closed cable retaining loop, as seen in FIGURES 1, 2 and 6.

At the same time the base 14 is flexed along its hinge groove 15 to tilt the anchor head halves away from each other to expand and lock the head against withdrawal through the hole 33, as is seen most clearly in FIGURE 6.

Once locked, as described, this form of the retainer 10 is practically impossible to unlock since the base shoulders of the tapered heads 21 and 23 resist all reverse motion through the holes 33 and 28 which are snugly inter-fitted by the stems 18 and 24, respectively.

Figure 7:
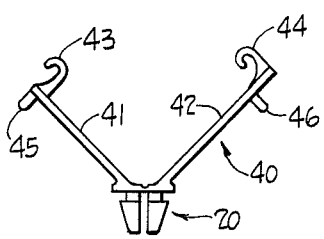
FIGURE 7 is a side elevation of a retainer, in its open condition, having an alternate type of article retaining lock.
Figure 8:
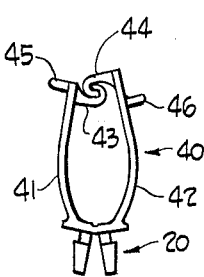
FIGURE 8 is a side elevation of the same, showing it in its fully locked condition.

In applications where the retainer must be capable of being re-opened for release or re-placement of the retained element 12, an alternate form of arm lock is provided as illustrated in FIGURES 7 and 8. This alternate type, broadly indicated by reference numeral 40, has a base and anchor head 20 similar to that of type 10.

However, its divergent arms 41 and 42 differ in that they have inturned hook elements 43 and 44 positioned at the free end of each arm. A finger grip 45 and 46 is positioned on the outer face of each arm, 41 and 42, respectively, proximate the base of the hooks. One hook 44 is curved downward and back upon itself. The other hook 43 is curved upward and back upon itself, so that when they are brought together, when the arms 41 and 42 are flexed to their second positions by pressure on the finger grips 45 and 46, the hooks 43 and 44 will override each other into locked engagement, as seen in FIGURE 8. The natural resiliency of the material of which the so flexed arms are made will keep the hooks interlocked. However, by applying appropriate squeezing pressure against the finger grips 45 and 46, the hooks 43 and 44 can be twisted and worked apart to release the arms, after which they can again be brought back into locked engagement, when desired.

It will now be clear that there has been provided a device which accomplishes the objectives heretofore set forth.

While the invention has been disclosed in a preferred and alternate form, it is to be understood that the specific embodiments thereof as described and illustrated herein are not to be considered in a limited sense as there may be other forms and modifications of the invention which should also be construed to come within the scope of the appended claim.

We claim:

In combination with a panel wall having a hole therethrough, an electric cable retainer, comprising, a base having two angularly disposed and opposed arms formed integral therewith and positioned at opposite edges thereof, the space between the arms at the base being less than the width of a human finger, the base having a hinge groove on the top side thereof between the two arms, and an anchor element positioned on the underside thereof aligned with the groove, the anchor element comprising a conical head mounted on a cylindrical stem, the diameter of the stem being less than that of the panel hole, the diameter of the base of the head being greater than that of said hole, the head and stem having a diametric slot, aligned with the base hinge grooves, dividing them into two identical halves free to flex with the base, at the hinge thereof, toward or away from each other, the arms and base being tiltable relative the hinge groove, upon the pressing of a finger between the arms at the base, to a first position wherein they are flexed away from each other to tilt the two halves of the anchor head toward each other, to contract the head, to permit passage thereof through the panel hole; and to a second position, when the finger is removed, wherein the arms are flexed toward each other to bring the arm ends into apposition to define a closed, cable supporting, loop and to tilt the base anchor head halves away from each other to expand and lock the head against withdrawal through the panel hole, and lock means on the arm ends for maintaining them in said second position.

References Cited in the file of this patent
UNITED STATES PATENTS

| | | |
|---|---|---|
| 1,479,150 | Mellus | Jan. 1, 1924 |
| 1,947,130 | Johnson | Feb. 13, 1934 |
| 2,382,945 | Trafton | Aug. 14, 1945 |
| 2,896,889 | Hershberger | July 28, 1959 |
| 2,931,851 | Sims | Apr. 5, 1960 |
| 2,969,216 | Hallsey | Jan. 24, 1961 |